United States Patent [19]

Chludzinski et al.

[11] Patent Number: 5,658,365
[45] Date of Patent: Aug. 19, 1997

[54] APPARATUS FOR APPLYING TENSION TO A FIBER PREFORM DURING SOOT DEPOSITION

[75] Inventors: Paul A. Chludzinski; David A. Tucker, both of Wilmington; Johnnie E. Watson, Hampstead; John G. Williams, Wilmington, all of N.C.

[73] Assignee: Corning Incorporated, Corning, N.Y.

[21] Appl. No.: 355,507

[22] Filed: Dec. 14, 1994

Related U.S. Application Data

[63] Continuation of Ser. No. 85,480, Jun. 21, 1993, abandoned.

[51] Int. Cl.$^6$ .................................................. C03B 37/027
[52] U.S. Cl. ........................... 65/484; 65/533; 65/283; 65/489; 65/534; 65/531
[58] Field of Search .......................... 65/379, 377, 421, 65/489, 484, 533, 109, 144, 283, 285, 411, 534

[56] References Cited

U.S. PATENT DOCUMENTS

| | | | |
|---|---|---|---|
| 2,188,121 | 1/1940 | Smith | 65/421 |
| 3,556,758 | 1/1971 | Andrews | 65/283 |
| 3,656,925 | 4/1972 | Dunlap | 65/36 |

FOREIGN PATENT DOCUMENTS

| | | | |
|---|---|---|---|
| 61-17435 | 1/1986 | Japan | 65/421 |
| 63-151640 | 6/1988 | Japan | 65/421 |
| 3-228844 | 10/1991 | Japan | 65/421 |
| 5-97458 | 4/1993 | Japan | 65/421 |

OTHER PUBLICATIONS

Translation of Japanese A–012 42433, Mar. 1988.

*Primary Examiner*—John Hoffmann
*Attorney, Agent, or Firm*—William J. Chervenak

[57] ABSTRACT

An apparatus is provided for applying a tensile force along the longitudinal axis of a cane assembly during the deposition of soot thereon to produce an optical fiber preform. Fiber drawn from such a preform exhibits improved core/clad concentricity. The tensile force may be applied at one or both ends of the cane assembly, with application at both ends being preferred. The tensile force may be varied during the deposition of soot. The cane assembly may be annealed prior to beginning the deposition of soot thereon.

7 Claims, 5 Drawing Sheets

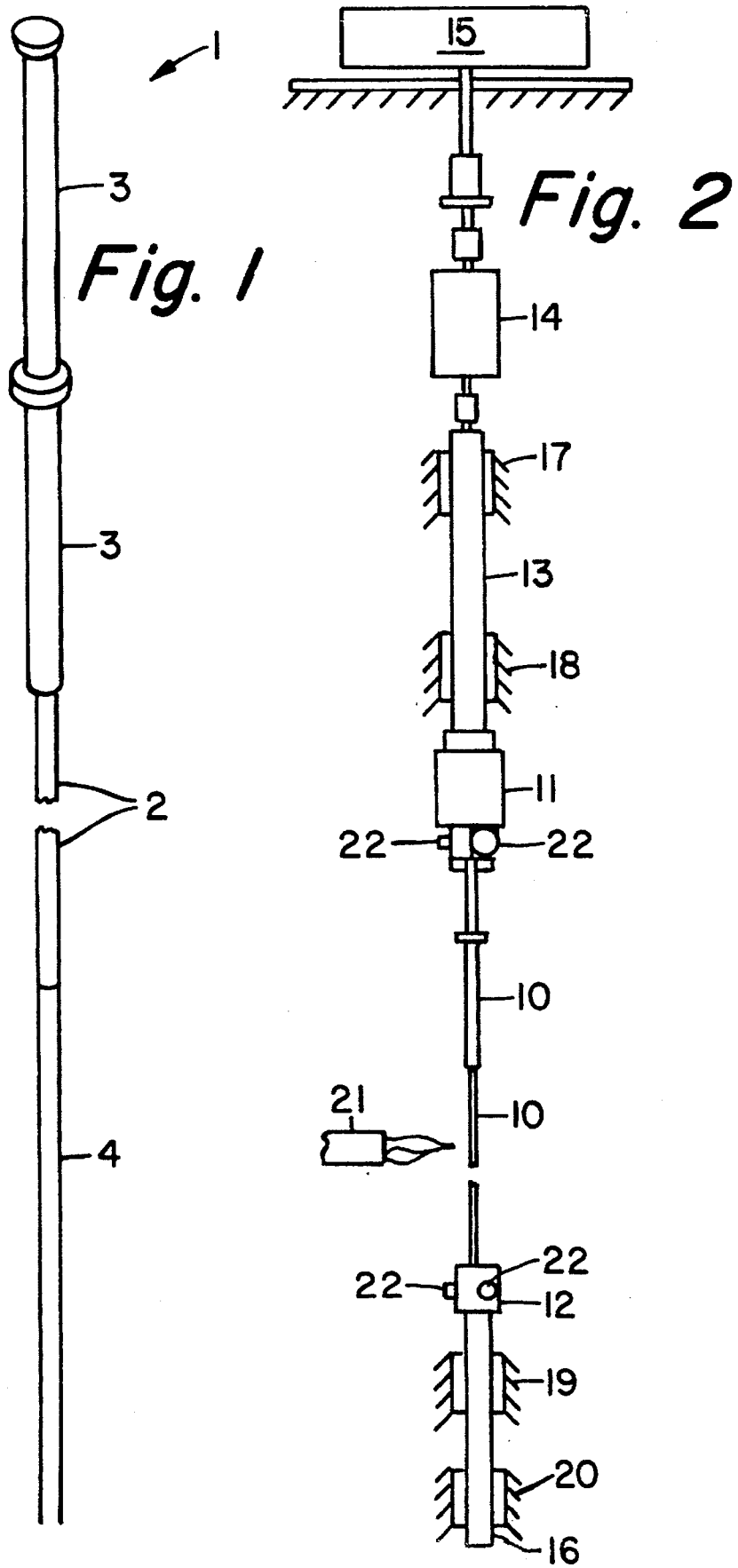

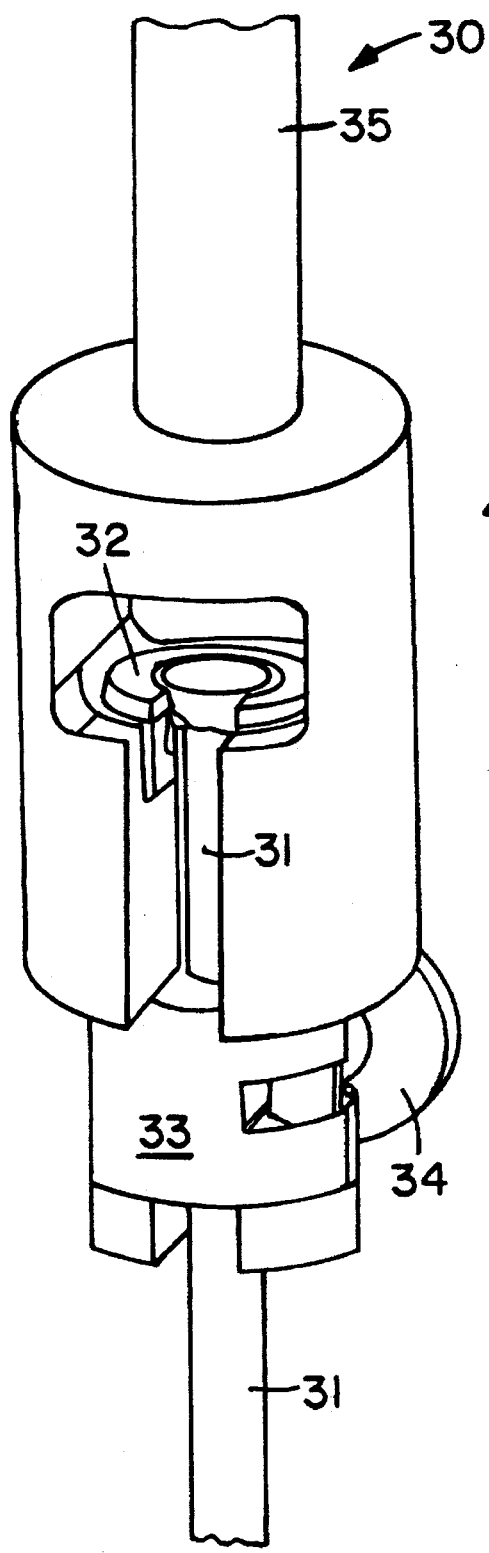
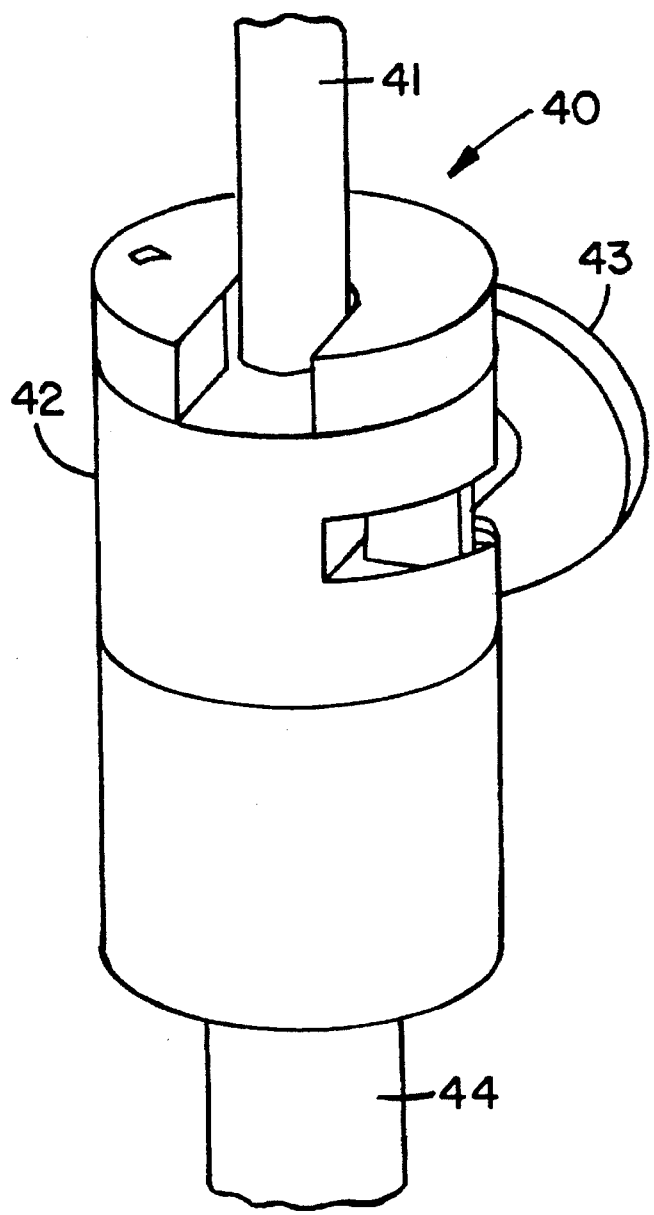
Fig. 3
Fig. 4

APPARATUS FOR APPLYING TENSION TO A FIBER PREFORM DURING SOOT DEPOSITION

This is continuation of Ser. No. 08/085,480 filed on 21 Jun. 1993, now abandoned.

BACKGROUND OF THE INVENTION

This invention relates to an apparatus for making an optical fiber preform which can be drawn into a fiber with an improved core/clad concentricity.

In the manufacture of an optical fiber, a preform is typically made using either outside vapor deposition (OVD), vapor axial deposition (VAD) or modified chemical vapor deposition (MCVD) techniques. OVD and VAD preforms are then dehydrated and consolidated to form a solid glass blank while MCVD preforms are collapsed to form a solid glass blank. The glass blanks are then drawn into fiber. Alternatively, the glass blanks can be drawn into core cane which is then overclad using OVD or rod-in-tube techniques to form an overclad preform. The overclad preform is subsequently dehydrated and consolidated to form an overclad glass blank which is then drawn into fiber.

One parameter of interest in the drawn fiber is the core/clad concentricity (hereinafter referred to as concentricity). Concentricity is a measure of how well the core of a fiber is centered with respect to the overall center of the fiber. FIG. 7 shows a cross-section of an optical fiber 70 with core region 71 having center A and clad region 72 having center B. The concentricity can then be characterized by the distance X between core center A and clad center B.

It is believed that for an overclad preform, the concentricity is determined during the overclad soot deposition step. FIG. 1 depicts a cane assembly 1 in which a rod 2 is attached to an upper cane handle 3 and a lower cane handle 4. If a cane assembly as shown in FIG. 1 is not made perfectly straight, it will wobble when rotated during the soot deposition process. This wobble will result in uneven deposition of soot around the cane due to the relative movement of the cane assembly with respect to the soot stream. Even if a cane assembly could be made perfectly straight, wobble is likely to develop because of changes in stresses in the cane assembly which result from heating the cane assembly during the soot deposition process.

To provide higher throughput and equipment utilization, the size (both length and diameter) of an optical fiber preform has been increased in recent years. As the length is increased, the potential for problems with wobble is substantially increased, resulting either from cane assemblies which are not perfectly straight or from changes in stresses in the cane assembly during the soot deposition process.

FIG. 2 depicts a typical apparatus used for overclad soot deposition onto a cane assembly. Cane assembly 10 is placed in upper chuck 11. Lower chuck 12 is attached to the lower end of cane assembly 10. Upper chuck 11 is attached to upper spindle 13. Upper spindle 13 is also attached to spindle motor 14 which is in turn attached to weighing device 15. Lower chuck 12 is attached to lower spindle 16. Spindle motor 14 is used to rotate upper spindle 13, upper chuck 11, cane assembly 10, lower chuck 12 and lower spindle 16, thereby flowing soot deposition to occur about the outer surface of cane assembly 10. Burner 21 represents a well known burner used in OVD processes, such as that disclosed in Backer et at. U.S. Pat. No. 5,067,975, the pertinent potions of which are incorporated herein by reference. Air bearings 17, 18, 19 and 20 are essentially frictionless in the direction of the axis of cane assembly 10. This allows the weight of the cane assembly to be accurately determined by weighing device 15 during the soot deposition process. By taring, or zeroing, the initial weight of the cane assembly and components of the apparatus prior to starting the soot deposition process, the weight of soot deposited on cane assembly 10 can be accurately determined. This allows a control system (not shown) to determine, based on the weight of soot deposited, when to change process parameters, including the composition of the soot being deposited, and when to shut down the soot deposition process upon completion thereof.

Upper chuck 11 and lower chuck 12 can be adjusted using screws 22 to exert moments on the ends of the cane assembly to reduce any wobble which might result from untrueness about the centerline of the chucks. The process for adjusting the upper and lower chucks is called truing and can be tedious and time consuming. Additionally, the moments exerted on the ends of the cane assembly generate stresses within the cane assembly. The subsequent heating of the cane assembly during the soot deposition process will change the stress pattern within the cane and will result in wobble of the cane assembly during soot deposition.

It is an object of the present invention to improve the core/clad concentricity of an optical fiber by reducing the wobble during overclad soot deposition. It is another object of the present invention to improve the utilization of the apparatus used for overclad soot deposition.

SUMMARY OF THE INVENTION

According to one aspect of the present invention, a cane assembly chucking device is provided which substantially reduces the time required to load a cane assembly into an apparatus for depositing soot thereon and which provides precise and rigid chucking of the ends of a cane assembly.

According to another aspect of the present invention, a cane assembly chucking device is provided which applies tension to a cane assembly loaded therein, the tension serving to reduce wobble induced by changes in stress resulting from heating which occurs during the soot deposition process.

BRIEF DESCRIPTION OF THE DRAWINGS

FIG. 1 shows a cane assembly typically used in a soot deposition process to form an optical waveguide soot preform.

FIG. 2 is a schematic of a typical apparatus used in a soot deposition process.

FIG. 3 is an upper cane chucking assembly according to one aspect of the present invention.

FIG. 4 is a lower cane chucking assembly according to one aspect of the present invention.

DETAILED DESCRIPTION

Figure 7:
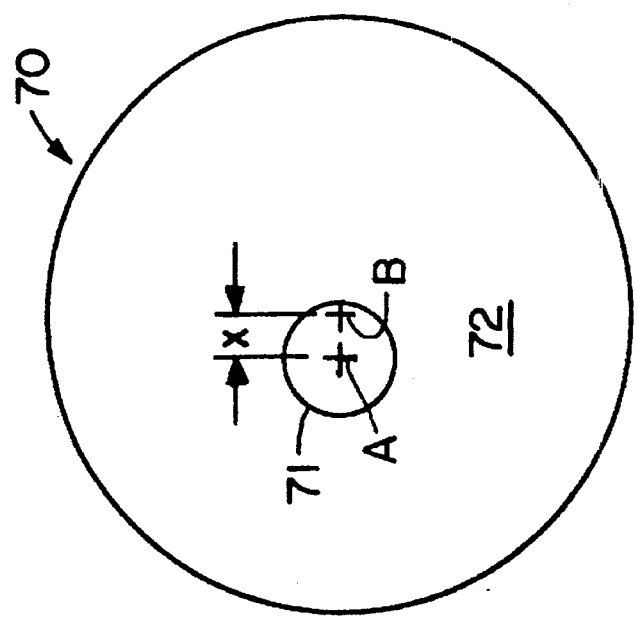
FIG. 7 is a representation of core/clad concentricity.

FIG. 3 depicts an upper cane chucking assembly 30 according to one aspect of the present invention. Upper cane chucking assembly 30 of FIG. 3 is positioned similarly to upper chuck 11 of FIG. 2. Upper cane handle 31 (similar to upper cane handle 3 of FIG. 1) is supported vertically by cup 32. Cup 32 is allowed to move in a plane which is perpendicular to the axis of upper cane handle 31. Shell clamp 33 rigidly positions upper cane handle 31 in a plane which is perpendicular to the axis of the upper cane handle. Knob 34 is used to open and close shell clamp 33. The diameter of upper cane handle 31 matches the inner diameter of shell clamp 33 so that upper cane handle 31 is precisely and rigidly held. Upper spindle 35 of FIG. 3 is positioned similarly to upper spindle 13 of FIG. 2.

A lower cane chucking assembly 40 is shown in FIG. 4 and would be similarly positioned on the soot deposition apparatus as lower chuck 12 in FIG. 2. Lower cane handle 41 is inserted into lower cane chucking assembly 40. Shell clamp 42 rigidly positions lower cane handle 41 in a plane which is perpendicular to the axis of lower cane handle 41. Knob 43 is used to open and close shell clamp 42. The diameter of lower cane handle 41 matches the inner diameter of shell clamp 42 so that lower cane handle 31 is precisely and rigidly held. Lower spindle 44 is positioned similarly to lower spindle 16 of FIG. 2. By using a centerless grinding process to form the upper and lower cane handles, handles are provided which have precise diameters and which are very round in cross-section, i.e., exhibit very little or no eccentricity about the longitudinal axis. This allows for very tight clearances between the cane handles and the inner diameters of the chucking assemblies such that the handles are precisely and rigidly held by the chucking assemblies.

By holding a cane assembly with upper and lower cane chucking assemblies as shown in FIGS. 3 and 4, the cane assembly is substantially vertical at both ends. When the upper and lower cane chucking assemblies are properly aligned relative to each other, the wobble of a cane assembly held therein is substantially reduced, by up to a factor of four.

As air bearings 17, 18, 19 and 20, as shown in FIG. 2, are essentially frictionless in the direction of the axis of the cane assembly, the cane assembly is placed in tension by the weight of the lower cane chucking assembly. It has been determined that additional tensile force on the cane assembly is preferable to reduce wobble resulting from stresses which occur in the cane assembly during soot deposition. However, for equipment reliability, it is preferable to increase the tensile force on the cane assembly without adding weight to the lower chuck. Such added weight would increase the stresses on the drive components above upper spindle 13, thereby increasing the potential for failure of those components. Also, the added weight could result in the total weight of the drive components, chucking assemblies, cane assembly and overclad soot deposited thereon exceeding the capacity of weighing device 15. Of course, it is possible to overcome this last limitation by replacing weighing device 15 with a higher capacity device, but doing so would not be preferable because a higher capacity weighing device would also reduce the precision of the weight measurements.

Figure 5:
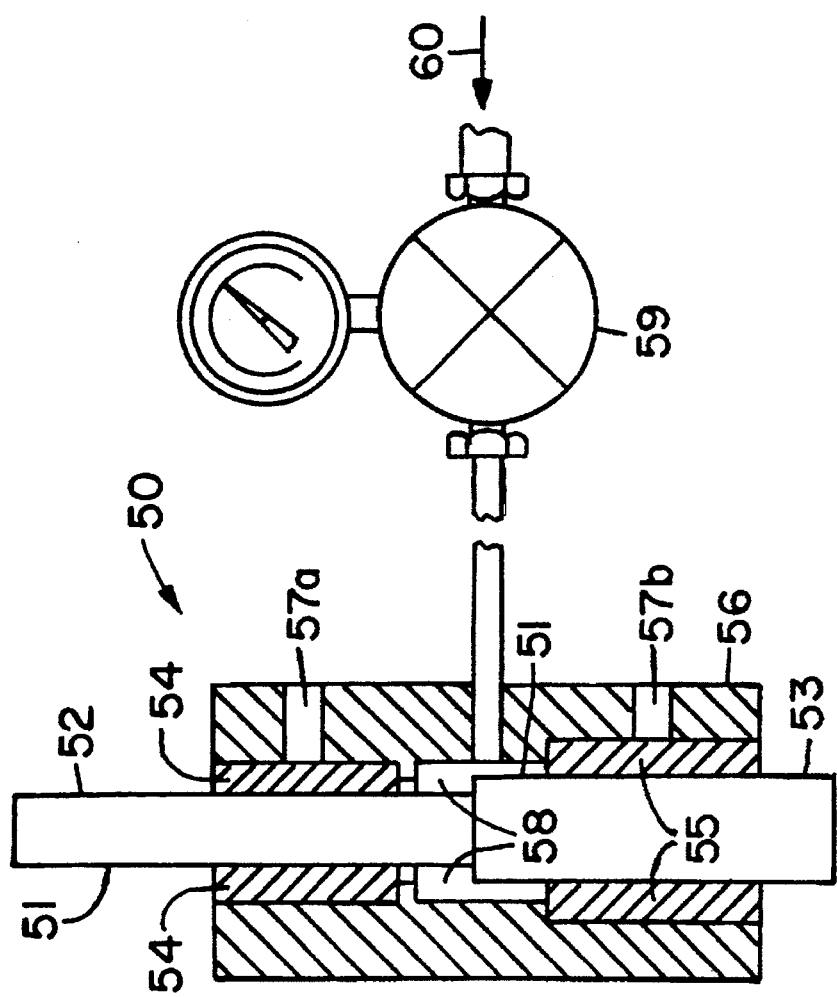
FIG. 5 is a bearing assembly according to one aspect of the present invention.

In order to provide additional tensile force on a cane assembly without increasing the stresses on the drive components, the air bearing assembly shown in FIG. 5 is provided. As shown in FIG. 5, air bearing assembly 50 is for use at the lower end of a cane assembly. Lower spindle 51, which is positioned similarly to lower spindle 16 of FIG. 2, is a stepped diameter shaft. The upper portion 52 of spindle 51 has a smaller diameter than the lower portion 53. Upper air bearing 54 is sized for upper portion 52 and lower air bearing 55 is sized for lower portion 53. Bearing block 56 includes air supply ports 57a and 57b, which are connected to an air supply (not shown) at sufficient pressure for operation of the air bearings. A cavity 58 is positioned in bearing block 56 between upper air bearing 54 and lower air bearing 55. Pressure regulator 59 is connected to cavity 58.

The operation of air bearing assembly 50 is as follows. Air that flows through an air bearing is forced axially along the spindle. A portion of the air is directed upwardly along the spindle and the rest of the air is directed downwardly along the shaft. As shown in FIG. 5, the air directed downwardly through upper air bearing 54 and the air directed upwardly through lower air bearing 55 flows into cavity 58. Cavity 58 is connected to the exit side of pressure regulator 59. The inlet 60 of pressure regulator 59 is connected to the same air supply as that which enters the bearing block 56 through ports 57a and 57b.

The pressure in cavity 58 can be controlled by adjusting pressure regulator 59. Preferably, no air enters cavity 58 through regulator 59. Instead, pressure regulator 59 controls the pressure in cavity 58 by bleeding off air which enters the cavity through the air bearings.

By pressurizing cavity 58, an air piston is established with the air bearings functioning essentially as frictionless seals. The difference in the cross-sectional areas of the upper and lower potions of the spindle result in a downward force being applied to the lower potion. This downward force will be applied to a cane assembly attached to the lower spindle. The magnitude of the downward force can be adjusted by changing the difference in the cross-sectional area or by changing the pressure in cavity 58.

By turning air bearing assembly 50 upside down, the air bearing assembly can be used at the upper end of the soot deposition apparatus. By placing air bearing assemblies at both the top and bottom of the cane assembly, the tension can be increased on the cane assembly without increasing the stress on the drive components at the top of the soot deposition apparatus.

Figure 6:
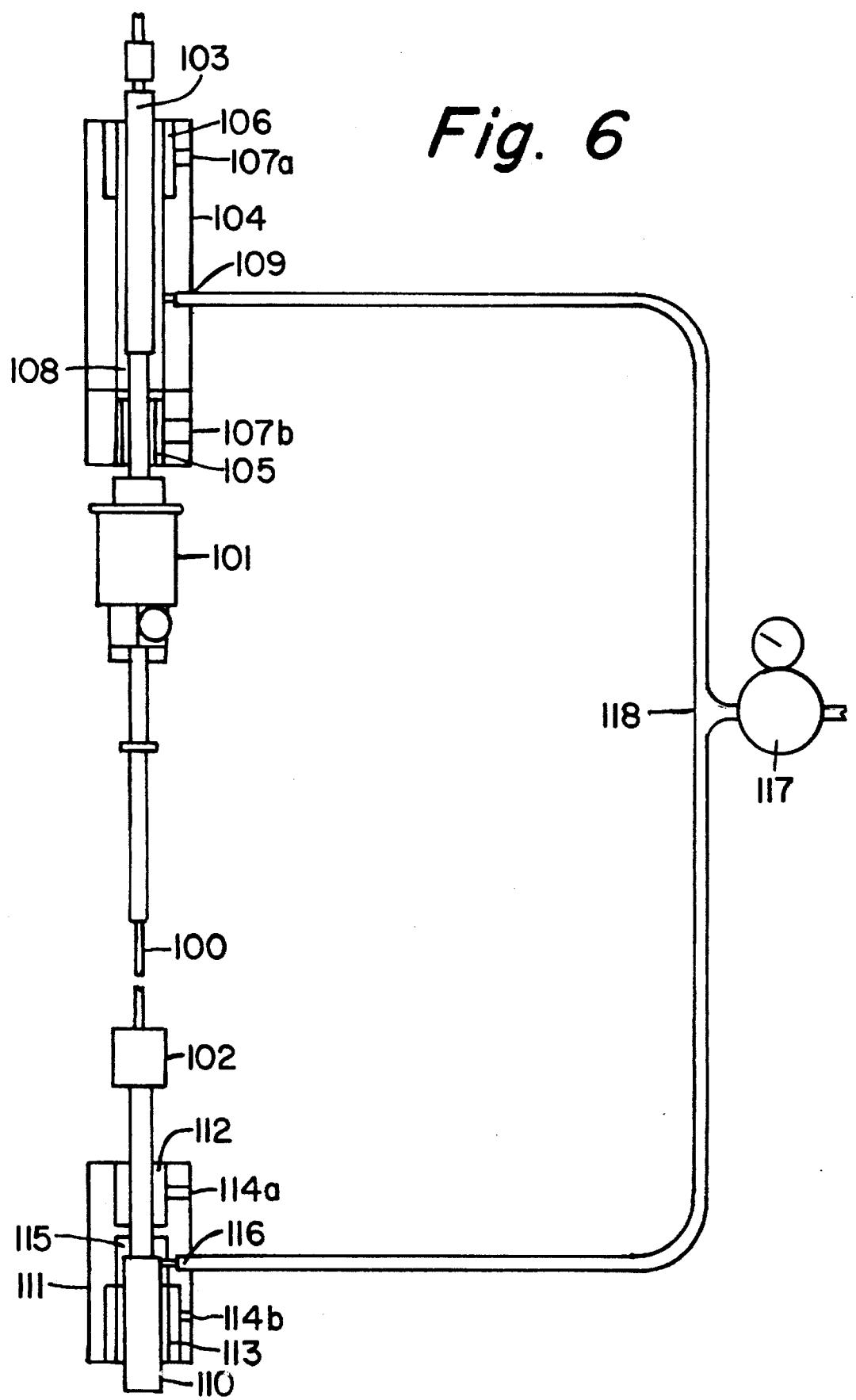
FIG. 6 is a bearing system according to another aspect of the present invention.

FIG. 6 shows a soot deposition apparatus with upper and lower bearing assemblies similar to that shown in FIG. 5 and described above. Cane assembly 100 is held by upper chuck 101 and lower chuck 102. Upper chuck 101 is attached to upper spindle 103, which is a stepped diameter shaft. Upper spindle 103 is constrained from moving perpendicular to its axis by upper bearing assembly 104. Upper bearing assembly 104 includes air bearings 105 and 106, air supply ports 107a and 107b, cavity 108 and pressure regulator port 109. Upper spindle 103 is attached to rotational and weighing equipment not shown but similar to that shown in FIG. 2. An upward force is generated on cane assembly 100 by the design of upper spindle 103 and upper bearing assembly 104.

Lower chuck 102 is attached to lower spindle 110. Lower spindle 110 is constrained from moving perpendicular to its axis by lower bearing assembly 111. Lower bearing assembly 111 includes air bearings 112 and 113, air supply ports 114a and 114b, cavity 115 and pressure regulator pert 116. A downward force is generated on cane assembly 100 by the design of lower spindle 110 and lower bearing assembly 111.

Pressure regulator ports 109 and 116 are shown in FIG. 6 connected to one pressure regulator 117 by tension control pressure line 118. This provides for the same pressure to be present in cavities 108 and 115. If the pressures are equal in cavities 108 and 155 and the difference in cross-sectional area of the upper and lower portions of the spindles 103 and 110 are equal, the upward and downward forces, resulting from the present invention, on cane assembly 100 will be equal. Therefore, the cane assembly will be placed in tension without putting additional stress on the drive components above the upper spindle. It is possible to have separate pressure regulators for each of the cavities such that different pressures could be provided in the cavities, however, this may induce additional stress on the drive components above the upper spindle. Also, the use of a single pressure regulator, as shown in FIG. 6, avoids erroneous weight readings during the soot deposition process which can result from pressure changes caused by the heating of equipment.

The tension under which the cane assembly is held will act to move the cane assembly toward the centerline established by the upper and lower chucking assemblies. This action occurs even if the stresses in the cane assembly change as a result of heating during the soot deposition process. Therefore, wobble resulting from changes in stress in the cane assembly will be substantially reduced. The design allows for easy loading of a cane assembly and unloading of a soot preform by setting the pressure regulator such that there is no pressure in the cavities during loading and unloading operations.

The tension applied to the cane assembly may be varied during the soot deposition process. This variation may be done by manual adjustment of the pressure regulator or by providing components for the automatic measurement, adjustment and control of the pressure in the cavities. It may be desirable to adjust the tension applied to the cane assembly to reduce the potential for destruction of a preform caused by failure of the cane assembly chucking mechanisms. One example of such a failure is slippage of the lower chuck on the cane assembly which results in loss of the entire preform due to physical damage to the preform when the lower end is free of the lower chuck.

One example of the method of the present invention will be described, with reference numerals referring to those shown in FIG. 6. This example applies a tensile force to cane assembly 100, using a pneumatic system. Regulator 117 is adjusted so that normal atmospheric pressure is present in cavities 108 and 115. This results in no forces generated on upper chuck 101 or lower chuck 102 and facilitates loading of cane assembly 100 into the apparatus. Cane assembly 100 is placed into upper chuck 101 and held therein. Cane assembly 100 is then placed into lower chuck 102 and held therein. In a preferred embodiment, upper chuck 101 and lower chuck 102 are shell clamp chucks as disclosed and shown in FIGS. 3 and 4.

After placing cane assembly 100 in the chucks, regulator 117 is adjusted to provide a pressure of about 40 psi (about $2.76 \times 10^5$ Pa) in cavities 108 and 115. The cane assembly is then rotated at about 100 rpm. An OVD overclad soot deposition process, similar to that disclosed in Backer et at. U.S. Pat. No. 5,067,975, is then used to produce a preform from which an optical fiber is drawn.

An optional annealing step can be used prior to the deposition of soot on the cane assembly. At least one soot deposition burner, such as that disclosed in Backer et al., is ignited with only gas and oxygen flowing through it and no soot precursor vapors such as $SiCl_4$. The burner is then oscillated along at least a portion of the length of cane assembly 100 to anneal the cane assembly. This annealing step allows any stresses in the cane assembly to be relieved prior to the deposition of any soot thereon and improves the core/clad concentricity in fiber drawn from the blank produced using this method.

In one example of the present invention, a soot deposition apparatus similar to that shown in FIG. 6 was used. The smaller diameter of the spindle shafts was 1 in. (2.54 cm) and the larger diameter was 1.5 in. (3.81 cm). This resulted in a difference in cross-sectional area of 0.982 $in^2$ (6.33 $cm^2$). The pressure regulator was set to provide a pressure of about 40 psi ($2.76 \times 10^5$ Pa) in the cavities. The combination of the cross-sectional area difference and the pressure in the cavities resulted in about 40 pounds (about 178 N) of force on each end of the cane assembly. In this example, an annealing process was used with six deposition burners, with total flows for all six burners of 120 slpm $CH_4$ and 100 slpm $O_2$, oscillating along about the middle 60% of the length of a cane assembly. The burners were oscillated along that portion of the cane assembly for about twelve minutes.

The core/clad concentricity of fiber drawn from preforms produced in the example described above was measured using standard test equipment. Approximately 4000 km of fiber were produced with an average core/clad concentricity of 0.228 µm and a sigma of 0.112 µm. For the approximately 15,000 km of fiber made by the same soot deposition apparatus prior to the above example, the average core/clad concentricity was 0.255 µm with a sigma of 0.13 µm. In this example, therefore, the present invention resulted in an improvement of about 10.5% in the average core/clad concentricity. Using known statistical analysis based on a skewed normal distribution, it is predicted that the present invention will result in a loss rate for concentricity of about 90 parts per million (ppm) as compared to about 480 ppm without the benefits of the present invention.

Figure 8:
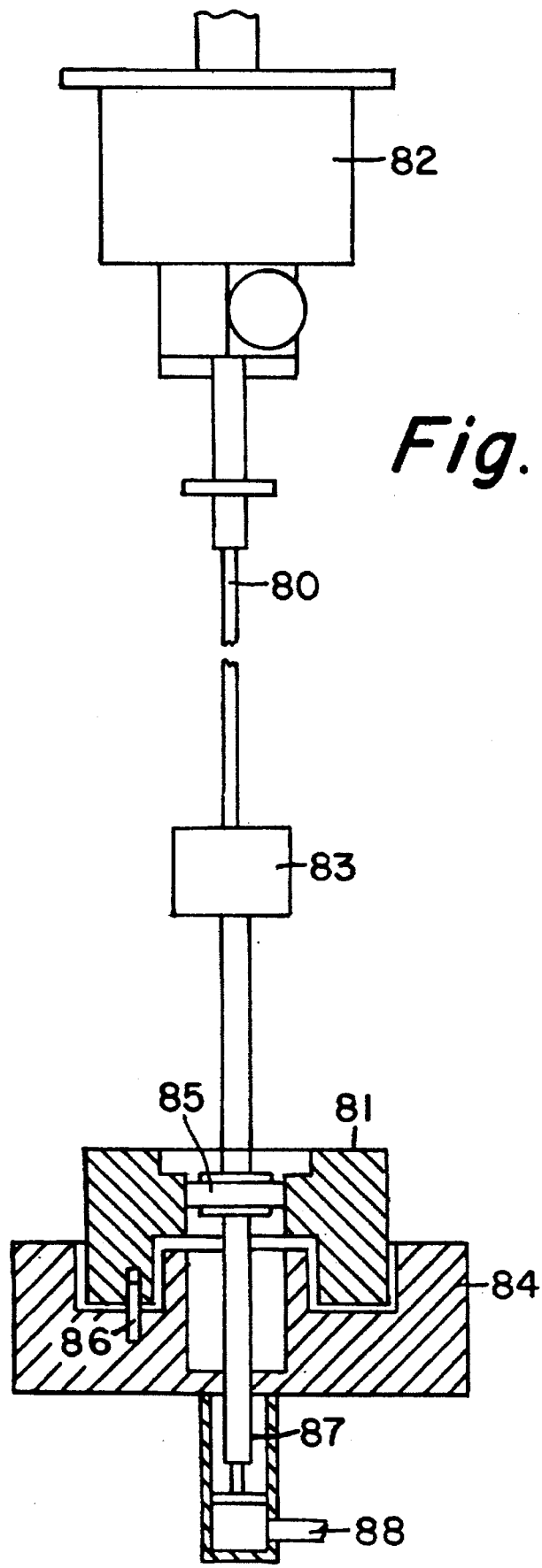
FIG. 8 is a cane assembly tensioning system according to another aspect of the present invention which uses a weight to apply a tensile force.

Another example of the apparatus and method of the present invention is described with reference to FIG. 8. In this example, a tensile force is applied to cane assembly 80 through the use of weight 81. Cane assembly 80 is placed in upper chuck assembly 82 and held therein, preferably by clamping means previously described with reference to FIG. 3. Weight 81 and lower chuck assembly 83 are lifted off pedestal 84 by a force generated by fluid, for example air, provided through inlet 88 under piston 87. Cane assembly 80 is placed in lower chuck assembly 83 and held therein, preferably by clamping means described with reference to FIG. 4.

After securing cane assembly 80 in upper chuck assembly 82 and lower chuck assembly 83, pressure beneath piston 87 is released. This pressure release results in a tensile force applied to cane assembly 80 due to the gravitational force of weight 81. During soot deposition, cane assembly 80 is rotated by drive means (not shown) attached to upper chuck assembly 82. Lower chuck assembly 83 rotates along with cane assembly 80. The lower end of lower chuck assembly 83 is attached to bearing 85 which is also attached to weight 81 such that lower chuck assembly 83 rotates independently of weight 81. Weight 81 is constrained from rotating by pin 86 which is inserted into both weight 81 and pedestal 84. The combination of bearing 85 and pin 86 minimizes the torsional stresses applied to cane assembly 80 during soot deposition.

Although the present invention has been described with respect to a cane assembly held in a vertical orientation during soot deposition, it is also applicable to a cane assembly held in a horizontal orientation during soot deposition. The present invention provides for the application of a tensile force along the axis of a horizontal cane assembly by using at least one air bearing assembly as described herein. Also, although the present invention has been described with respect to producing an overclad preform, it is equally applicable to the manufacture of a core preform from which core cane may be drawn. In the case of the manufacture of a core preform, a bait rod, which is preferably removed after the core soot deposition process, is used instead of a cane assembly.

The present invention has been particularly shown and described with reference to the preferred embodiments thereof, however, it will be understood by those skilled in the art that various changes may be made in the form and details of these embodiments without departing from the true spirit and scope of the invention as defined by the following claims.

We claim:

1. An apparatus for holding a cane assembly, said cane assembly having a discrete length and a longitudinal axis, during deposition of glass particles to form an optical waveguide preform, comprising:
   a. first holding means for holding a first end of said cane assembly,
   b. second holding means for holding a second end of said cane assembly,
   c. means connected to said first holding means for generating a first tensile force along the longitudinal axis of said cane assembly due to a gravitational force of the means connected to said first holding means, said first tensile force being in addition to any tensile force caused by the weight of said cane assembly or any deposit thereon, and
   d. means for rotating said cane assembly, wherein said means connected to said first holding means comprises
      a. a weight,
      b. a bearing attached to said weight such that during rotation of said cane assembly, said cane assembly rotates about its longitudinal axis substantially independently of said weight, and
      c. means for preventing said weight from rotating such that said weight does not substantially impart a torsional stress on said cane assembly.

2. An apparatus for holding a cane assembly, said cane assembly having a longitudinal axis, during deposition of glass particles to form an optical waveguide preform, comprising
   a. first holding means for holding a first end of said cane assembly,
   b. second holding means for holding a second end of said cane assembly, and
   c. first bearing means connected to said first holding means by a first spindle, said first bearing means comprising first and second air bearings through which said first spindle is inserted, said first and second air bearings being separated by a first cavity,
   d. means for pressurizing said first cavity to a first pressure above ambient pressure, wherein said first spindle has a first section with a first diameter and a second section with a second diameter different from said first section, said first and second spindle sections being joined at a transition region that is located in said first cavity, and wherein said first spindle and said first pressure in said first cavity generate a first force which is applied to said cane assembly along the longitudinal axis of said cane assembly, said first force being directed away from said second holding means.

3. The apparatus of claim 2, further comprising
   a. second bearing means connected to said second holding means by a second spindle, said second bearing means comprising third and fourth air bearings through which said second spindle is inserted, said third and fourth air bearings being separated by a second cavity which can be pressurized to a second pressure above ambient pressure, wherein said second spindle and said second pressure in said second cavity generate a second force which is applied to said cane assembly along the longitudinal axis of said cane assembly, said second force being directed away from said first spindle.

4. The apparatus of claim 3, wherein said first and second pressures are the same.

5. The apparatus of claim 2, wherein said cane assembly is held in a vertical orientation.

6. The apparatus of claim 2, wherein said cane assembly is held in a horizontal orientation.

7. The apparatus of claim 2, wherein said first and second holding means rigidly hold said cane assembly such that movement of said cane assembly perpendicular to the longitudinal axis of said cane assembly is constrained, and wherein said first and second holding means are aligned such that the longitudinal axes of said first and second ends of said cane assembly are substantially aligned with each other.

* * * * *